No. 822,702. PATENTED JUNE 5, 1906.
J. W. WALTERS.
CLUTCH AND TRANSMISSION GEAR.
APPLICATION FILED JUNE 9, 1903. RENEWED SEPT. 28, 1905.
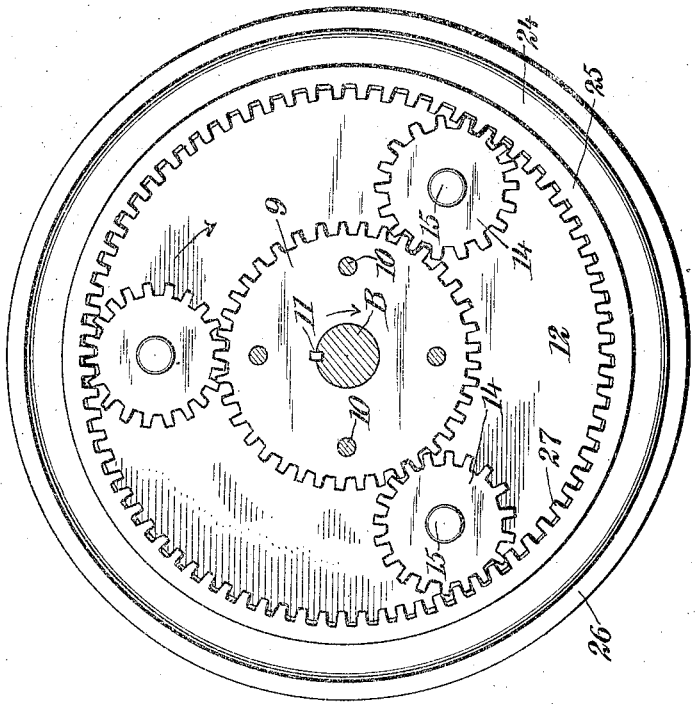
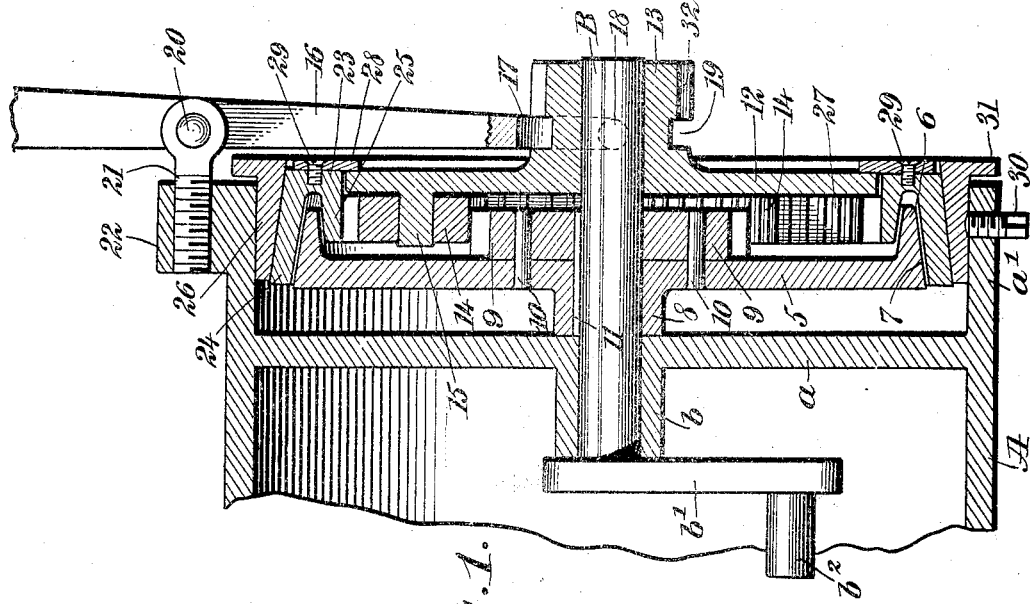
WITNESSES:
INVENTOR
Julius W. Walters
BY
ATTORNEYS

UNITED STATES PATENT OFFICE.

JULIUS W.M. WALTERS, OF NEW YORK, N. Y.

CLUTCH AND TRANSMISSION-GEAR.

No. 822,702.         Specification of Letters Patent.         Patented June 5, 1906.

Application filed June 9, 1903. Renewed September 28, 1905. Serial No. 280,460.

*To all whom it may concern:*

Be it known that I, JULIUS WM. WALTERS, a citizen of the United States, and a resident of the city of New York, borough of Manhattan, in the county and State of New York, have invented a new and Improved Clutch and Transmission-Gear, of which the following is a full, clear, and exact description.

My invention relates to improvements in a combined clutch and transmission-gear; and one object that I have in view is to combine in one structure a two-speed or differential transmission-gear and a clutch device adapted to control the starting and stopping of the machine to which the new device is applied.

A further object of the invention is to compactly arrange the several parts with a view to making them take up a very small amount of space on a motor-vehicle or any other form of machine or apparatus, and, furthermore, to simplify the construction, cheapen the cost of manufacture, and promote the efficiency of operation.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in both the figures.

Figure 1 is a vertical sectional elevation through a combined clutch and differential speed-transmission gear constructed in accordance with my invention, and Fig. 2 is an elevation showing the trains of gears between the driven member and the shiftable intermediate member of the device.

In the drawings I have shown my improved device as especially adapted for use in connection with certain parts of a motor-cycle, wherein—

A indicates a portion of a gear-casing which is provided with an end wall *a* and with an extension *a'* in the form of an annular flange. The end wall of the gear-casing is provided with a bearing-sleeve *b*, which accommodates the shaft B, having a portion projecting beyond the gear-casing; but the other end of this shaft is provided with a suitable device adapted to be driven by a motor—such, for example, as the crank-arm *b'*, having a crank-pin $b^2$.

The driving member of my improved device is represented in the form of a disk 5, having a laterally-extending flange 6, the outer or working face of which flange is made cone-shaped, as indicated at 7. This disk is provided with a hub 8, which is fitted on the shaft B, and to one side or face of the disk is made fast a spur-gear 9. The spur-gear is concentric with the driving member 5, and it is shown as being secured firmly to said driving member by rivets 10; but it will be understood that the spur-gear and the disk 5 may be made in one piece, if desired. According to my invention it is essential that the disk 5 and the gear 9 be made fast one with the other, so as to rotate simultaneously, and this disk with the gear practically constitute one part which forms the driving element of the improved device. This driving element is made fast with the shaft B by any suitable mechanical contrivance—such, for example, as the key 11.

12 designates the driven member, which is provided with an elongated sleeve or hub 13, the latter being fitted loosely on the projecting end portion of the shaft B and adapted to turn freely thereon. The driven member is of less diameter than the driving member 5, and it carries a series of spur-gear pinions 14, which are idly mounted on a series of studs or pins 15, the latter being made integral with the driven member 12 or attached in a suitable way thereto. The series of gear-pinions 14 are disposed to have intermeshing engagement with the teeth of the gear 9, which rotates with the driving member 5, as shown by Fig. 2, and this driven member 12 is adapted to be shifted lengthwise of the shaft B for a limited distance by means of a lever 16. Said lever is provided with a fork 17, which embraces the hub or sleeve 13 of the driven member and is operatively connected therewith by suitable projections 18 of the fork (see dotted lines in Fig. 1) fitting in an annular groove 19 of the sleeve. Said lever 16 is fulcrumed by a pin or bolt 20, attached to a supporting-shank 21, that is fastened in a lug 22 of the gear-casing A.

It is obvious that the lever 16 may be shifted in one direction or the other for the purpose of moving the driven member 12 on the shaft B laterally with respect to the driving member 5; but the shiftable adjustment of said driven member 12 does not disengage the series of gear-pinions 14 from the spur-gear 9, which is fast with said driving member 5.

23 designates an intermediate shiftable member which is made in the form of a ring and arranged to fit circumferentially and loosely on the driven member 12, said intermediate shiftable member having a coöperative relation to the driving member 5 and to the cup 26, which is fast with the extension a' of the gear-case. The intermediate member 23 is provided with two flanges 24 25, the same being integral with the member 23 and occupying the positions indicated more clearly by Fig. 1. The flange 24 of the intermediate member is provided with beveled inner and outer faces, thereby producing a conical portion on the shiftable member, whereas the flange 25 is in the form of an annulus which is concentric with the axis of the shaft B. This annular flange 25 is provided with a continuous series of internal gear-teeth 27, the same being presented in opposing relation to the teeth of the gear-pinions 14, which are journaled on the driven member 12, whereby the teeth 27 of the intermediate member 23 have intermeshing engagement with the series of pinions on the driven member 12. From this description it will be seen that the shiftable intermediate member 23 is constructed with an internal gear and with a conical flange, the latter adapted to serve as the female member of a clutch, because it is presented into coöperative relation to the surface 7 on the flange 6 of the driving member 5, said flanged driving member also serving as the male member of a clutch. The internally-toothed flange 25 of the shiftable member 23 fits within the conical male flange 6 of the driving member 5 in order that the parts may occupy a very compact relation, whereas the conical flange 24 of said intermediate member 23 is presented between the surface 7 of the driving member 5 and the internal tapering surface of the cup 26. The driven member 12 fits loosely inside of the annular flange 25 of the intermediate member 23 in order that one face of said driven member 12 may engage near its periphery with the inner edges of the series of gear-teeth 27, thus insuring the movement of the member 23 with the member 12 when the latter is pressed in an inward direction by the proper movement of the lever 16. The movement of the intermediate member 23 with the driven member 12 when the latter is shifted in an outward direction is secured by the employment of a face-ring 28, the latter being applied laterally to the member 23 and fastened thereto by screws 29. This face-ring is thus made fast with the intermediate member, and it projects inwardly therefrom in order to have overlapping engagement with the shiftable member 12, whereby the edge portion of this shiftable member is confined between the series of gear-teeth 27 and the face-ring 28, as clearly shown by Fig. 1.

The cup 26 has an external annular surface, and it is of such diameter that it can be fitted snugly within the extension a' of the gear-case. This cup is adapted to be held stationary within said case extension by any suitable means—such, for example, as the set-screw 30, which has a threaded bearing in the extension a' and is adapted to impinge the cup. The cup is also provided with an annular flange 31, and the inner surface of the cup is of conical or tapering form, which corresponds to the external taper of the conical flange 24 of the intermediate member 23, whereby said flange 24 is adapted to have tight frictional engagement with the cup when the intermediate member 23 is shifted with the driven member 12 in an outward direction.

Motion is transmitted from the driven member 12 to any proper part by a suitable transmitting mechanism, and in Fig. 1 this member 12 is shown as having a gear 32, adapted to drive a train of gearing, a sprocket-chain, or the like.

It will be understood that my improved clutch and gear may be used in connection with any kind of machinery.

The operation of the invention may be described as follows: Assuming that the shaft B is in motion, the member 5 and its gear 9 rotate with said shaft at all times, while the driven member 12 and the intermediate member 23 loosely surround said shaft, so as to remain at rest or be driven from said member 5 or the gear 9, according to the adjustments of the parts. The lever 16 may readily be operated to move the members 12 23 either inwardly or outwardly; but when said members 12 23 occupy a middle position between the driving member 5 and the cup 26 the clutch mechanism is free or released, so that the driven member 12 remains at rest or in an idle position, thus unclutching the shaft B from the device which it is desired to drive—such, for example, as the driving-wheel of a motor-vehicle. The operation of the lever 16 to shift the driven member 12 in an outward direction causes the edge portion of said member to engage with the face-ring 28 and to move the member 23 in a similar direction, so that the external surface of the conical flange 24 will have tight frictional engagement with the stationary cup 26, thereby clutching the intermediate member 23 with said cup 26 and holding said intermediate member in a fixed or locked condition. The motion of the spur-gear 9, which rotates with the member 5 and the shaft B, operates to turn the series of gear-pinions 14, and the train of gearing thereby propels the driven member 12 at a slow speed. If it is desired to drive the parts at a higher speed, the lever 16 is operated to move the member 12 and the intermediate member 23 in an inward direction, so that the internal face of the conical flange 24 will have tight frictional engagement with the face 7 on the male cone 6 of the driving member 5. This adjustment brings the intermediate member 23 and the driving member 5 directly into engagement, and the series of gear-pinions 14 are thus locked fast with the driven member 12 by the toothed engagement of said gear-pinions with the spur-gear 9 and the internally-toothed flange 25 of the intermediate member, whereby the driving member 5, the intermediate member 23, the driven member 12, and the gears 9 14 will all rotate at a relatively higher speed because the parts are clutched directly together.

My improved construction of clutch and transmission-gear provides a very compact form of mechanism, wherein the parts are disposed to take up a very small amount of room, and these parts are simple in construction, easy of assemblage and operation, and they are cheap of manufacture. It is evident that the cup 26 may easily be disconnected from the gear-case for the purpose of permitting access to be obtained to any of the working parts in case it is desired to repair or inspect the same.

Having thus described my invention, I claim as new and desire to secure by Letters Patent—

1. In a device of the class described, the combination with a shaft, of a driving member having a gear, a driven member, a shiftable member coöperating with said driving member and having an internal gear, and intermediate gears carried by the driven member and having meshing relation to the gear on the driving member and the internal gear of the intermediate member.

2. A device of the class described, having a driving member provided with a gear, a loosely-mounted driven member carrying a series of gears, an intermediate member disposed in coöperative relation to the driving member and provided with an internal gear which meshes with the series of gears on the driven member, and means for shifting the intermediate member relatively to the driving member.

3. A device of the class described, having a driving member provided with a gear, a loose driven member carrying a series of gears which mesh with said first-named gear, a loose intermediate member provided with a conical flange and with an internal gear, a stationary clutch member in coöperative relation to the conical flange of the intermediate member, and means for shifting said intermediate member laterally with respect to the clutch-surface and the driving member.

4. A device of the class described, having a driving member forming a male clutch member and provided with a gear, an intermediate female clutch member in coöperative relation to the male clutch member formed by the driving member and provided with an internal gear, a driven member carrying a series of gears which mesh with the gears of the driving and intermediate members, and means for shifting the intermediate member relatively to the driving member.

5. In a device of the class described, a driving member having a male clutch and provided with a gear, a female clutch intermediate member having an internal gear and disposed in coöperative relation to said driving member, a stationary clutch member coöperating with the intermediate member, and a driven member having a series of gears which mesh with the gears of the driving and intermediate members.

6. A device of the class described, having a driving member provided with a gear and with a male cone, a shiftable driven member carrying a series of gears, an intermediate member having a female cone and an internal gear disposed in coöperative relation to the male cone and to the series of gears on the driving and driven members respectively, means for insuring movement of the intermediate member laterally with the driven member, a clutch member coöperating with the conical surface of the intermediate member, and means for adjusting the driven member laterally with relation to the driving member.

7. In a device of the class described, the combination with a gear-case, of a cup fixed thereto, a shaft, a driving member having a conical flange and a concentric spur-gear, a driven member mounted loosely on the shaft, a series of gears carried by said driven member, an intermediate member having a conical flange and an internally-toothed flange, said conical flange of the intermediate member being disposed in coöperative relation to the cup and the conical flange of the driving member, whereas the internally-toothed flange of said intermediate member has meshing engagement with the spur-gears on the driven member, a ring secured to the intermediate member and lapping the driven member, and means for shifting the driven and intermediate members with respect to the cup and the driving member.

8. The combination of a male clutch member, a conical brake member an intermediate member having two clutch-surfaces which are in coöperative relation to the male clutch member and to the conical brake member respectively, a driven member and driving connections upon the driven member between the male clutch member and the intermediate member.

9. The combination of a male clutch member, a driven member, a brake member having an internal conical surface, a clutch member having two clutch-surfaces, male and female, disposed in coöperative relation to the male clutch member and the conical brake-surface respectively, and driving connections between the male and female clutch members and upon the driven member, said male and female clutch member being shiftable relatively to the conical brake-surface and the male clutch member.

10. The combination of a male clutch member, an annular brake member having a conical clutch-surface, an annular male and female clutch member having two clutch-surfaces disposed in coöperative relation to the male clutch member and the clutch-surface of the brake member respectively, driving connections between the male and female clutch members, and a driven member, said brake member and the female clutch member being disposed one within the other and compactly with relation to the male clutch member.

In testimony whereof I have signed my name to this specification in the presence of two subscribing witnesses.

JULIUS WM. WALTERS.

Witnesses:
   JNO. M. RITTER,
   H. T. BERNHARD.